3,836,641
TOOTHPASTES

Ronald Hoyles, Epsom Downs, and Stanley Alan Mitchell, Bagshot, England, assignors to Lever Brothers Company, New York, N.Y.
No Drawing. Filed Oct. 2, 1972, Ser. No. 294,419
Claims priority, application Great Britain, Oct. 5, 1971, 46,231/71
Int. Cl. A61k 7/16
U.S. Cl. 424—49                4 Claims

ABSTRACT OF THE DISCLOSURE

A translucent or transparent toothpaste which contains as abrasive agent a silica-alumina xerogel or silica-magnesia xerogel.

---

This invention relates to toothpastes, more particularly to those which are translucent or transparent.

Although there have been a number of proposals for making translucent or transparent toothpastes, it is only very recently that there have been suggested materials which permit the production of toothpastes of this kind containing a solid abrasive ingredient to impart cleaning properties to the toothpaste. One such material is that available commercially under the trade name Syloid 63 and which is a silica xerogel having a surface area above 600 square metres per gram and an average particle size of 8–12 microns. The use of this material in toothpastes is described in British Specification 1,186,706. Other silica xerogels which are suitable for use in formulating translucent or transparent toothpaste having cleaning properties are those described in British Specification No. 1,264,292. These materials are suitable for such use because their refractive indices (about 1.45) are close to those of the humectants commonly used in toothpastes, namely glycerine and sorbitol syrup (70%), and because they have especially good properties as toothpaste abrasive agents permitting a relatively high degree of cleaning and yet are not too abrasive as to be damaging to the tooth structure.

Netherlands Patent Application No. 7112989 describes the use of sodium aluminosilicates (and other corresponding alkali metal and alkaline-earth metal salts) as the polishing agent of translucent and transparent dentifrices.

We have now found that other materials that are useful for formulating translucent or transparent toothpastes having good cleaning properties are mixed oxide silica xerogels more particularly those containing a minor proportion of alumina or magnesia and which have hitherto been used as cracking catalysts. Such materials are commercially available from W. R. Grace Limited of N. Circular Road, London NW. 10. Silica alumina xerogels are also commercially available from Joseph Crosfield & Sons Limited of Warrington, England under the trade name "Synclyst."

Accordingly, the present invention relates to a translucent or transparent toothpaste which contains as abrasive agent a silica-alumina xerogel or silica-magnesia xerogel, particularly silica xerogels containing about 1 to 30% by weight on dry basis (i.e. after removal of volatiles) of alumina or magnesia.

The pore volume of the silica alumina xerogel or silica magnesia xerogel is preferably from 0.4 to 0.85 cc. g.$^{-1}$. They usually have a volatile content (as measured by loss on ignition at 955° C.) of less than about 15%.

Preferred materials are silica alumina xerogels; as mentioned, these are commercially available under the name "Synclyst." Various grades are available: these have levels of alumina of 25% and 13% and for each of these levels, grades of differing pore volume are available. These have typical pore volumes ranging from 0.68 to 0.80 cc. g.$^{-1}$ for the high alumina material and 0.68 to 0.77 cc. g.$^{-1}$ for the low alumina material.

The mixed oxide silica xerogels for use in this invention can be made by known processes. Thus the silica-alumina materials may be made by the method described in British Specification No. 796,756.

The silica-alumina materials used in this invention contain silica interbonded with alumina (i.e. Si-O-Al linkages are present)—see "The Colloid Chemistry of Silica and Silicates" by Ralph K. Iler, 1955, pages 261 and 262. However, they differ from the aluminosilicate salts of the Netherlands application in that they are substantially free of alkali metal or alkaline-earth metal, i.e., they contain less than about 0.1% by weight of sodium oxide ($Na_2O$) or other alkali metal or alkaline-earth metal oxide. The catalytic silica-alumina materials can be obtained from, for example, sodium aluminosilicate by exchanging sodium for hydrogen (see the Iler reference, page 194).

The silica-alumina and silica-magnesia xerogels used in this invention will usually have a refractive index of about 1.45 to 1.47. The refractive index should be substantially the same as the refractive index of the liquid phase of the toothpaste which will be constituted primarily of humectant material and water. Humectants commonly used are glycerine, sorbitol syrup and polyethylene glycol. The composition of the liquid phase is adjusted to match the refractive index of the silica-alumina or silica magnesia xerogel whereby the xerogel is invisible and the toothpaste is therefore translucent or transparent. The liquid phase will usually amount to about 50 to 90% by weight of the toothpaste.

The silica-alumina and silica-magnesia particles preferably have an average particle size of 5 to 40 microns and are present in an amount of 5 to 50% by weight of the toothpaste.

The translucent and transparent toothpastes of the invention may contain other ingredients known to those skilled in the art. Thus there may be present a thickening agent, such as a pyrogenic silica, silica aerogel or synthetic inorganic silicate clay such as is referred to in the above Netherlands application, e.g. the synthetic clay sold under the trade name Laponite CP or Laponite SP. Small proportions of an organic hydrocolloid thickener may also be used.

The toothpaste may also include a surface-active agent e.g. sodium lauryl sulphate or sodium lauroyl sarcosinate, sweetening agent, flavouring agent, chloroform, fluorine-containing material e.g. sodium fluoride, stannous fluoride or sodium monofluorophosphate, anti-bacterial agent e.g. 1,6 - di-(p-chlorophenyl biguanido)hexane or a non-toxic addition salt thereof, preservative or colouring agent. The toothpaste may also include materials to give various visual effects, such as coloured particles, pearlescent flakes or iridescent particles.

A typical translucent toothpaste in accordance with this invention has the following composition. Percentages are by weight.

EXAMPLE

|   | Percent |
|---|---|
| Silica-alumina xerogel (Synclyst MS.25/Grade 73) | 14.00 |
| Sorbitol syrup (70%) | 51.40 |
| Glycerine | 16.90 |
| Sodium carboxymethylcellulose | 0.30 |
| Silica thickening agent (Gasil 23) | 8.00 |
| Polyethylene glycol (MW 1540) | 5.00 |
| Sodium lauryl sulphate | 1.45 |
| Saccharin | 0.20 |
| Flavour, chloroform | 2.05 |
| Colour (0.1% aqueous solution) to 100.00%. | |

The silica-alumina xerogel employed contained 25% alumina and had a pore volume of 0.73 cc. g.$^{-1}$. Its loss on ignition at 955° C. was 10%. It was milled and classified to an average particle size of 17 microns. The thickening agent was a silica aerogel of average particle size 3 microns.

The silica-alumina xerogel in the above Example may be replaced by a silica-magnesia xerogel. The latter are also available commercially as acid catalysts from W. R. Grace Limited. Typical of such catalysts are those containing 30% by weight on dry basis of magnesia as MgO, pore volume 0.65 cc. g.$^{-1}$ and surface area 500 m.$^2$g.$^{-1}$. A typical loss on ignition at 955° C. for such material is 12% by weight.

What is claimed is:

1. A translucent or transparent toothpaste containing as abrasive cleaning and polishing ingredient about 5% to about 50% by weight of a xerogel selected from the class consisting of
    (i) silica-alumina xerogels having a content of alumina of from about 1% to about 39% by weight on dry basis; and
    (ii) silica-magnesia xerogels having a content of magnesia of from about 1% to about 30% by weight on dry basis;

and having a pore volume of from about 0.4 to about 0.85 cc. g.$^{-1}$ and an average particle size of from about 5 microns to about 40 microns.

2. A toothpaste as claimed in claim 1 wherein the abrasive ingredient is a silica-alumina xerogel containing about 13% by weight on dry basis of alumina.

3. A toothpaste as claimed in claim 1 wherein the abrasive ingredient is a silica-alumina xerogel containing about 25% by weight on dry basis of alumina.

4. A toothpaste as claimed in claim 1 wherein the abrasive ingredient is a silica-magnesia xerogel containing about 30% by weight on dry basis of magnesia.

References Cited

UNITED STATES PATENTS

| | | | |
|---|---|---|---|
| 2,519,622 | 8/1950 | Archibald et al. | 252—317 |
| 3,538,230 | 11/1970 | Pader et al. | 424—50 |

RICHARD L. HUFF, Primary Examiner